June 5, 1956  C. M. KINGHORN ET AL  2,749,155
RESILIENT PIPE JOINT WITH SHEET METAL CLAMP MEMBER
Filed Nov. 10, 1952
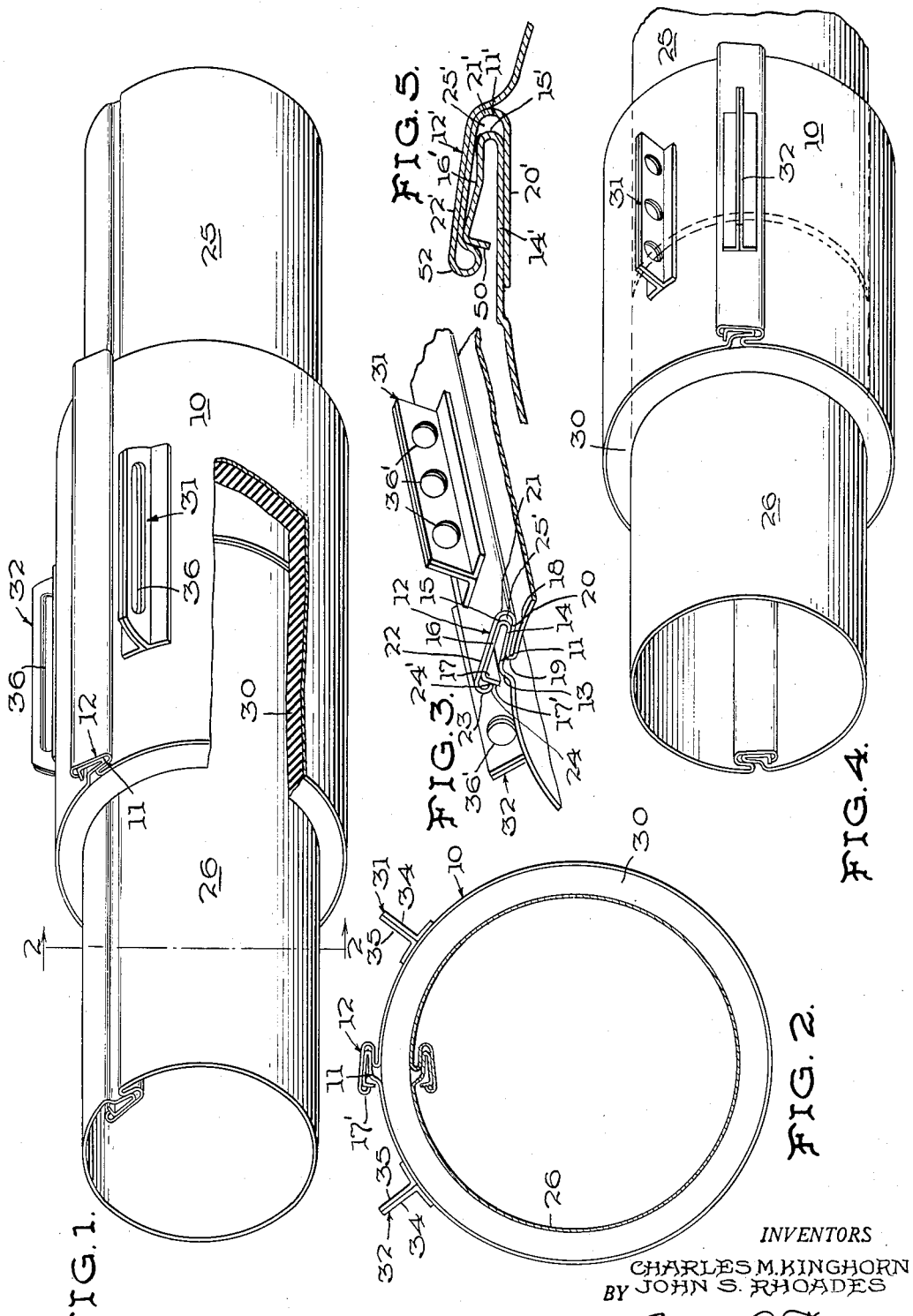
INVENTORS
CHARLES M. KINGHORN
BY JOHN S. RHOADES
James E. Tooney
ATTORNEY

United States Patent Office 2,749,155
Patented June 5, 1956.

2,749,155

RESILIENT PIPE JOINT WITH SHEET METAL CLAMP MEMBER

Charles M. Kinghorn, Rye, N. Y., and John S. Rhoades, Bethesda, Md., assignors to Kaiser Aluminum & Chemical Corporation, Oakland, Calif., a corporation of Delaware Application November 10, 1952, Serial No. 319,748

3 Claims. (Cl. 285—194)

This invention relates to couplings for ducts and tubings. More particularly, it is concerned with providing a novel coupling member for locking together adjacent sections of an irrigation conduit, wherein novel means are employed for conveniently snapping and unsnapping the coupling about the adjacent sections, said coupling also being adapted to provide a watertight joint between the adjacent sections of tubing.

In the irrigation of fields, orchards, etc., various parts of the fields or orchards are generally irrigated at different times. Consequently, the irrigation conduits are usually made in the form of removable sections, which allow the irrigation ducts or tubing to be quickly assembled and disassembled so that they may be readily moved to the particular part of the field or orchard to be watered.

Accordingly, it is extremely advantageous if a coupling member can be provided for joining the adjacent sections of the irrigation conduit together, which in addition to providing a watertight joint for the adjacent sections at the point where they are hooked together, can be easily snapped about or unlocked from the adjacent sections of tubing without the use of special tools.

It is a primary object of this invention therefore to provide a novel coupling for adjacent sections of irrigation tubing, which can be easily and quickly snapped into place and readily removed.

It is a further object of this invention to provide a novel coupling member for adjacent sections of irrigation tubing, which renders the joint, at the point where adjacent sections of tubing are locked together, watertight.

It is a further object of this invention to provide a novel coupling member for adjacent sections of irrigation tubing, which can be easily and quickly snapped into place and readily removed by hand without the use of special tools.

These and other objects are accomplished by providing in combination with a pair of adjacent duct sections and a gasket member suitably placed about portions of each of the two adjacent sections, a split coupling member roll formed from a resilient piece of sheet metal so as to be provided with two free marginal edges. One of these marginal edges forms a plug element and the other of these edges forming a socket element whereby when the former element is inserted in the latter, the edges of the coupling will be joined and in turn cause the adjacent sections to be locked together. This plug element in turn may be so folded as to be provided first with an offset portion from which a wall projects. An arcuate web portion connects this first wall to a second wall spaced from the first wall and this second wall then terminates in an angularly disposed lip portion provided with a flat surface. The socket element is so folded so as to be provided with a wall corresponding to the first wall in the plug element. An arcuate web portion connects this first wall to another wall corresponding to the second wall of the plug element and this latter wall terminates in a lip formed by a reversed bend in the wall. This latter wall terminates in a lip which projects inwardly toward the arcuate web in such a manner as to engage the flat surface of the angularly disposed lip on the plug member when the plug member has been inserted in the socket member. It is also an advantageous feature of the invention that suitable hand grips be fastened to the coupling member adjacent the joint formed by the plug and socket elements by means of which the said elements may be easily separated or alternately forced together.

These and other objects and advantages will become more apparent by reference to the following detailed description when taken in conjunction with the appended drawings, wherein:

Figure 1 is a perspective view partially cut away of the coupling member assembled about the adjacent sections making up an irrigation duct;

Figure 2 is a sectional view taken along lines 2—2 of Figure 1;

Figure 3 is a perspective view, partially broken, of the upper portion of the coupling member, showing a modification of the coupling member of Figure 1 and with the gasket member removed;

Figure 4 is a perspective view, partially broken of the coupling member of Figure 3 and indicates the manner in which it is applied to the adjacent sections of an irrigation conduit; and, Figure 5 is a sectional view of a modified type of joint which may be used in locking the free marginal edges of the split coupling member together.

With further reference to the drawings and particularly Figures 1 and 2, the split coupling member 10 of the instant invention is generally roll formed from a resilient sheet of metal in such a way that one of the free marginal edges thereof constitutes a plug element 11 and the opposing free marginal edge forms a socket element 12.

The marginal plug member 11 is folded in such a way as to be provided with an offset or shoulder portion 13 from which projects a wall 14, an arcuate web portion or a broad apex 15, and a second wall 16, spaced from wall 14, with this latter wall terminating in a generally rectangular lip portion 17. The plug or male member thus defines a resilient metallic V on one of the mating marginal edges of the coupling and is coextensive therewith.

The complementary marginal socket element 12 is suitably folded so as to be provided with a wall portion 18, a bend 19, a wall 20 substantially parallel to wall 18, and corresponding to the wall 14 of the plug element, an apex or web portion 21, and a wall 22, which corresponds to wall 16 of the plug element. Wall 22 finally terminates in a reverse bend 23 having a free lip portion 24 which projects in a direction toward the apex or web 21. Thus the socket defines a receptacle opening in the direction of the plug and into which the marginal plug member is insertable.

When these two elements are brought into contact, one with another so that the plug member 11 is inserted within the socket member 12, the raw edge 24' of the lip portion 24 of the socket member bites into the flat surface 17' of the angularly disposed lip portion 17 on the plug member 11. The adjacent split sections 25 and 26 of the irrigation tubing may also be so formed as to be provided with similar plug and socket elements at the point where their free marginal edges are joined together, as indicated particularly in Figure 2.

In an advantageous embodiment of the invention it is also contemplated that the socket and plug elements 11 and 12 be of such dimensions that an open space 25' will exist in the interior of socket element 12 adjacent the apex or web portion 21 and the portions of walls 20 and 21 immediately joined thereto when the plug element 11 is located within the socket element 12. This space should be sufficiently large so as to permit adequate room for moving the plug element 11 relative to the socket element 12 and out of contact with the lip 23 of the socket element. In this way then a sufficient amount of working space is provided so as to permit the easy insertion and removal of plug element 11 within and from the socket element 12.

In an advantageous embodiment of the invention it is also contemplated that a suitable type of gasket member 30, which may be in the form of a split sleeve, be interposed between the coupling member 10 and the adjacent sections of the tubing conduit sections or members 25 and 26 at the point where they are joined, in such a way as indicated in Figure 1, that the gasket member 30 will peripherally cover portions of each of the sections 25 and 26, which make up the irrigation conduit.

In another advantageous embodiment of the invention, it is contemplated that suitable means such as the handles 31 and 32 be affixed to the coupling member 10. These handles may be conveniently formed, for example, by two L-shaped sections 34 and 35, placed back to back and welded together and with the base flanges thereof being either riveted or welded to the coupling 10 adjacent the joint formed by the socket elements 11 and 12 as indicated in Figure 2. These handle members may also be provided with suitable openings which can take the form of an elongated slot 36 as indicated in Figure 1 or fingerholes 36' as indicated in Figure 3. By use of these apertured handles it is possible, by placing the fingers through the apertures in the handles 31 and 32, to force the female or socket element and the male or plug element together quickly and easily.

In the preferred embodiment of the invention the position of the handle means is such that, as shown in Figs. 3 and 4, when it is desirable to unlock the joint, all that is necessary after the operator's fingers have been inserted in the holes 36' as indicated in Figure 3, is to lift the edge of lip 24 on the socket member 12 upwardly away from inturned lip 17 on the plug element 11, and thereafter by further pulling on the handles 31 and 32, plug and socket elements will be separated from one another. When it is desirable to lock the coupling 10 about the irrigation sections 25 and 26, all that is necessary after the split gasket 30 has been inserted about the two sections 25 and 26 at the point where they are to be joined, is to utilize the manual gripping members 31 and 32 to force the plug member up into the socket opening formed between the walls 20 and 22 thereof in such a way that the apex of the plug element is forced into close contact with the apex in the socket element, at which point, upon release of the handles and pressure on the plug and socket elements, they will be allowed to snap together with the inwardly directed lip 24 of the socket member contacting the right angularly disposed lip 17 of the plug member.

In Figure 5 a modified form of joint is disclosed for joining the free marginal edges of the split coupling 10 and/or sections 25 and 26 together. In this event the plug element 11' may be so folded as to be provided with a wall 14' connected to the main body portion of the coupling, an arcuate web portion 15' and a second wall 16' which may be bent or crimped, spaced from wall 14', with this latter wall terminating in a generally right angularly disposed lip portion 50. The socket element 12' may be so folded as to be provided with a wall 20', an apex or web portion 21' and a wall 22' of double thickness, this latter wall including bulbous element or lip 52, which is so arranged as to be engaged by lip 50 of the plug element 11', when it is inserted in the socket element 12'. Wall 22' is also connected to the main body portion of the coupling 10.

The crimping of the wall 16' on the plug element 11' gives the plug element great resiliency and provides for a better frictional contact between the plug and socket elements, when the one is fitted within the other.

From the above discussion, it will be obvious that an improved coupling member has been provided for an irrigation tubing or conduit which can be utilized any number of times and is readily adaptable for use in irrigation operations. Furthermore, it does not require the use of any special tools during installation and removal. In addition, the joint formed by the coupling member in combination with the gasket member and adjacent sections of the irrigation conduit forms an efficient watertight joint in the conduit which is satisfactory for the purposes designed.

It is obvious that various changes and modifications may be made in the invention without departing from the spirit and scope thereof as defined by the appended claims, wherein what is claimed is:

1. A joint for aligned hollow tubular members including a quick disconnect member, said disconnect member comprising a sheet metal sleeve having a longitudinally extending split portion, said sleeve overlapping and surrounding a portion of a pair of axially aligned tubular members to be coupled together, said sleeve member including a fastening means disposed radially outwardly of said sleeve and extending along the respective marginal edges defined by the split portion, said fastening means comprising an integrally formed and resiliently deformable V-shaped plug on one of said marginal edges having its apex disposed in a direction facing the opposite marginal edge, said plug including a portion radially offset outwardly from the axis of said tubular members, said offset portion terminating in a curved portion defining a fixed angle and a wall portion, said offset portion, said curved portion and said wall portion defining the integrally formed, resilient metal V-shaped plug, said wall portion including a further portion bent inwardly toward the axis of said tubular members defining a flat surface, said opposite marginal edge including a complementary, integrally formed V-shaped receptacle defined by a pair of generally divergent wall portions opening in the direction of said plug, the angle of divergency of said wall portions being less than the fixed angle formed by the elements of said V-shaped plug, one of said divergent wall portions including a reversely curved portion defining an edge engageable with said flat surface on said plug, said plug and said receptacle being coextensive in length with respect to each other and said sleeve, said receptacle including an outwardly and generally radially extending manually actuated handle means on the outermost wall of said divergent wall portions for deforming said outermost divergent wall portion to facilitate engagement and release of said plug with respect to said receptacle and thus installation and removal of said coupling with respect to said axially aligned tubular members.

2. A joint for aligned hollow tubular members as defined in claim 1, wherein said joint includes further a cylindrical hollow gasket member for sealing the connection between said axially aligned tubular member, said gasket member surrounding a portion of each of said tubular members and being in turn surrounded by said sleeve and being coextensive therewith.

3. A coupling as defined in claim 1, wherein said sheet metal sleeve is comprised of aluminum.

References Cited in the file of this patent

UNITED STATES PATENTS

| | | |
|---|---|---|
| 419,803 | Turner | Jan. 21, 1890 |
| 1,153,204 | Edwards | Sept. 14, 1915 |
| 1,715,008 | Rose | May 28, 1929 |
| 2,227,551 | Morris | Jan. 7, 1941 |
| 2,457,438 | Bennett | Dec. 28, 1948 |
| 2,522,097 | Cookson | Sept. 12, 1950 |
| 2,565,610 | Kinghorn | Aug. 28, 1951 |